J. W. Reid,

Horse Power.

Nº 47,456

Patented Apr. 25, 1865.

Witnesses:

Inventor:
J. Wyatt Reid

UNITED STATES PATENT OFFICE.

J. WYATT REID, OF NEW YORK, N. Y.

IMPROVEMENT IN HORSE-POWERS.

Specification forming part of Letters Patent No. 47,456, dated April 25, 1865.

*To all whom it may concern:*

Be it known that I, JOHN WYATT REID, of the city, county, and State of New York, have invented a new and Improved Horse-Power; and I do hereby declare that the following is a full, clear, and exact description thereof, which will enable others skilled in the art to make and use the same, reference being had to the accompanying drawings, forming part of this specification, in which—

Figure 1:
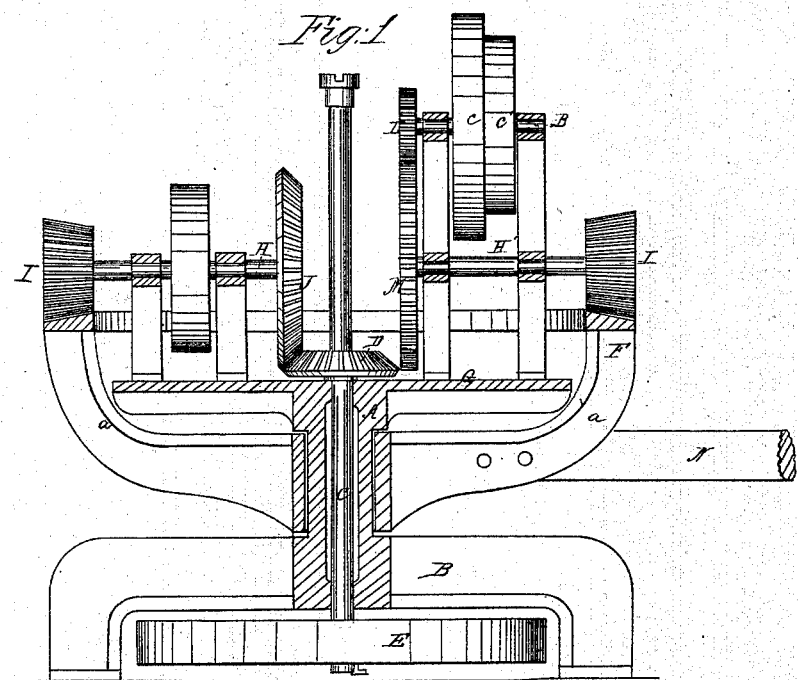
Figure 2:
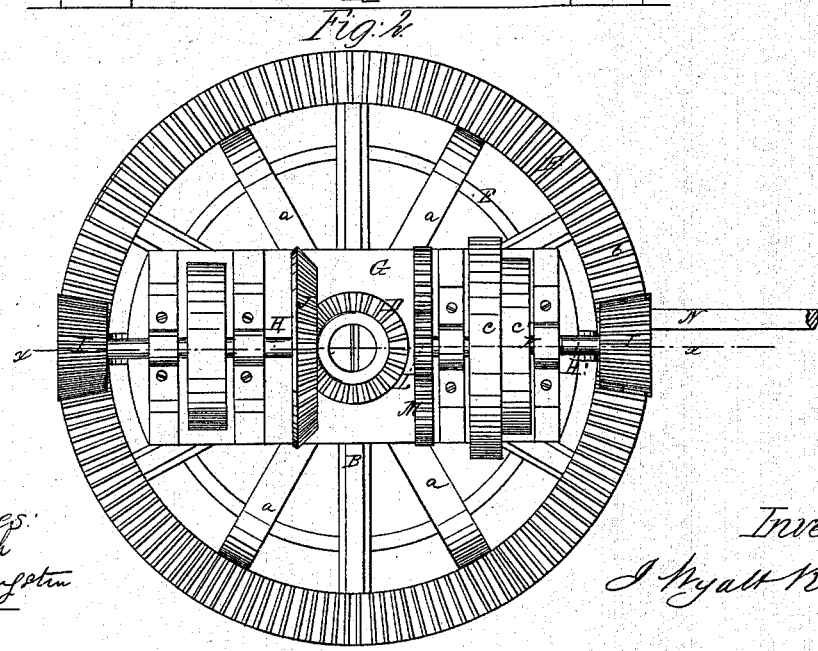

Figure 1 is a side sectional view of my invention taken in the line $x\ x$, Fig. 2; Fig. 2, a plan or top view of the same.

Similar letters of reference indicate like parts.

This invention consists in constructing or arranging the several parts in such a manner that power may be taken from different shafts having different degrees of speed, and machinery driven with a greater or less speed, and consequently with a greater or less application of power, as circumstances may require.

A represents an upright fixed spindle, the lower end of which is firmly secured in a base, B, constructed in any proper manner to support the working parts.

The spindle A is hollow or tubular, and within it there is placed an upright shaft, C, having upon it above the tubular fixed spindle A a bevel-wheel, D, and upon its lower end below A a band-wheel, E.

On the spindle A a master-wheel, F, is placed loosely and allowed to rotate freely. This wheel F is provided with curved arms $a$, projecting upward, so that the toothed rim $b$ will be sufficiently elevated above a platform, G, which is attached to or forms a part of the spindle A. This platform G serves as a support for the bearings of two shafts, H H′, both of which are driven by pinions I I from the master-wheel F. The upright shaft C is driven from the shaft H by a bevel-wheel, J, which gears into the bevel-wheel D. Above the shaft H there is placed a shaft, K, having upon it two band-wheels, $c\ c'$, and a pinion, L, which gears into a toothed wheel, M, at the inner end of shaft H′.

From the above description it will be seen that power may be taken from either of the shafts C H K, and as these shafts rotate with different speeds, and the difference of speed capable of being varied as desired by the application of band-wheels of different sizes, it follows that machinery may be driven with different rates of speed, as circumstances may require.

By the arrangement of the parts as described it will be seen that the shafts H K have an elevated position, so that bands or belts running therefrom will not interfere with the animals which are attached to the sweep N of the master-wheel F. The great advantage, therefore, of the invention consists in the arrangement whereby I am enabled to place the bearings of the shafts H H′ K, any or all of them, in an elevated position above and within the master-wheel F.

I claim as new and desire to secure by Letters Patent—

The combination of the master-wheel F, arms $a\ a'$, stationary tubular spindle A, platform G, shaft C, and one or more horizontal shafts H, when constructed and arranged to operate as herein specified.

J. WYATT REID.

Witnesses:
M. M. LIVINGSTON,
J. P. HALL.